Figure 1:
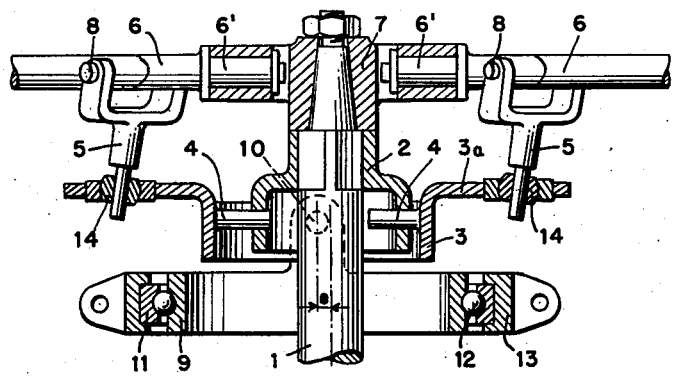

Sept. 23, 1952            J. ŠLECHTA            2,611,441
ECCENTRIC CYCLIC PITCH CONTROL MECHANISM
FOR ROTORS OF AIRCRAFT Filed Jan. 28, 1948            2 SHEETS—SHEET 1

INVENTOR.
Jaroslav Šlechta
BY
ATTORNEY

Sept. 23, 1952 J. ŠLECHTA 2,611,441
ECCENTRIC CYCLIC PITCH CONTROL MECHANISM
FOR ROTORS OF AIRCRAFT
Filed Jan. 28, 1948 2 SHEETS—SHEET 2

INVENTOR.
Jaroslav Šlechta
BY
ATTORNEY

Patented Sept. 23, 1952

2,611,441

UNITED STATES PATENT OFFICE 2,611,441

ECCENTRIC CYCLIC PITCH CONTROL MECHANISM FOR ROTORS OF AIRCRAFT

Jaroslav Šlechta, Prague, Czechoslovakia, assignor of one-half to Aviation Works, National Corporation, Prague, Czechoslovakia Application January 28, 1948, Serial No. 4,744
In Czechoslovakia November 15, 1946

4 Claims. (Cl. 170—160.25)

My invention relates to eccentric pitch control mechanisms for the rotors of aircraft particularly of helicopters.

It is known in the art to provide the rotors of helicopters with mechanisms effecting a periodical change of the incidence angle of the rotor blades in the course of a revolution in order to cause a continuous change of the lift and/or of the resistance of the rotor blades. Particularly it has already been suggested to use in such mechanisms adjustable noncircular or eccentric discs. However these constructions were very intricate and unreliable and they did not permit the reduction of the eccentricity of said disc to zero when the rotor was started or when the helicopter flew vertically.

The object of my invention is to avoid the said disadvantages and to provide a cyclic pitch control mechanism which is simple and reliable in construction and which will permit changing quickly and easily the pitch of the rotor blades within wide limits.

The said and other objects of my invention will be more fully understood from the following specification when read with the accompanying drawing.

In the drawing

Figure 2:
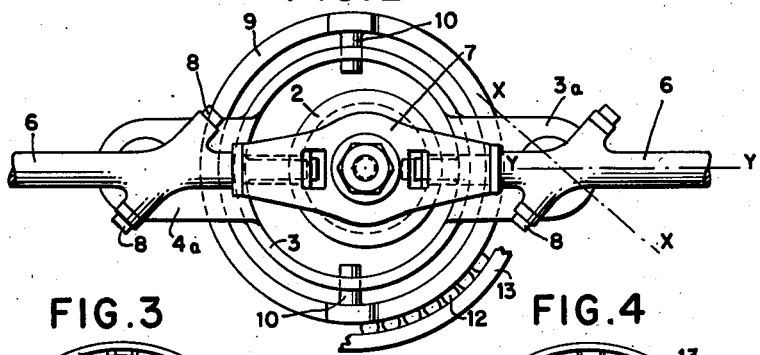
Figure 3:
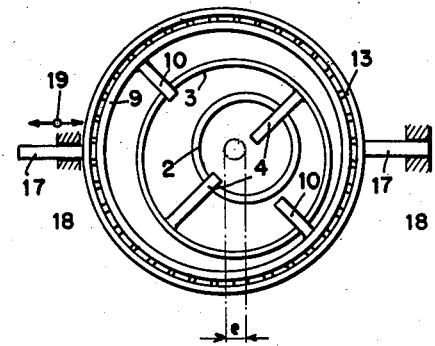
Figure 4:
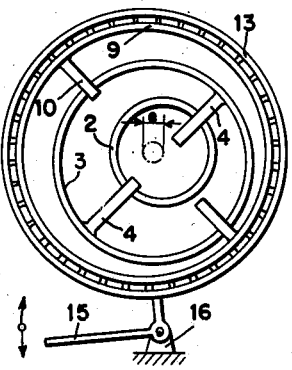
Figure 5:
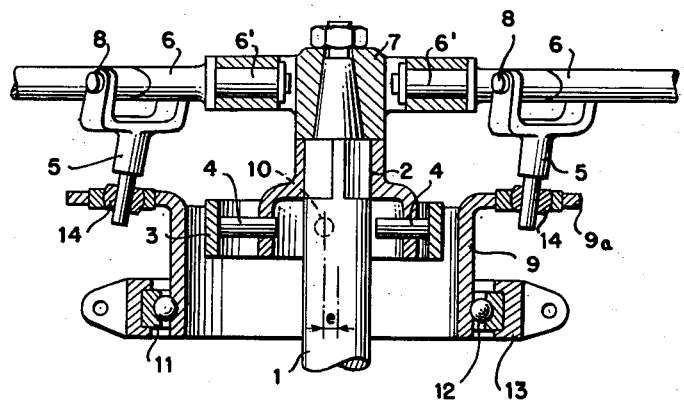
Figure 6:
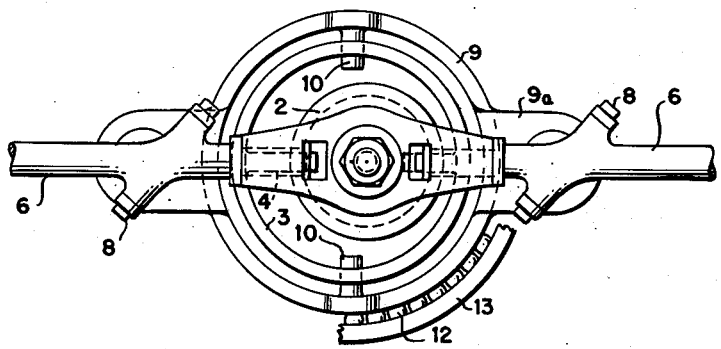

Fig. 1 shows a longitudinal sectional view of an embodiment of the pitch control mechanism according to my invention, Fig. 2 shows a plan view thereof, Figs. 3 and 4 show each in a diagrammatic manner a top view of one embodiment of a part of my mechanism more particularly described hereinafter, and Figs. 5 and 6 show a longitudinal sectional view and a plan view, respectively, of a modified embodiment of my invention.

The same reference characters indicate the same or equivalent parts in all figures.

As shown in Figs. 1 and 2 the rotor shaft 1 carries the hub 7 of the rotor which comprises two blades mounted with the pivotal ends 6' of the blade shafts 6 in said hub for an oscillating movement about their longitudinal axis. Such oscillating movement of the blades is achieved by a mechanism later described in detail through the action of levers 5 which span with their forked ends pivots 8 mounted in each blade shaft 6 obliquely to the longitudinal axis $y$—$y$ thereof. It will be well understood that said levers 5 when swung in any other plane than that perpendicular to the axis of the pivots 8 as indicated by the line $x$—$x$ in Fig. 2 will effect the said oscillating movement of the respective rotor blade about its longitudinal axis and thus vary its pitch.

The said mechanism effecting and controlling the said oscillating movement of the rotor blades is basically composed of three concurrently rotating members namely an inner driving member 2, an intermediate coupling member 3 and an outer control member 9. The said three members are jointed in a gimbal-like manner and may be displaced eccentrically relative to each other. To this purpose the intermediate member 3 is provided with two opposing radial pegs 4 which slidably engage corresponding apertures in the driving member 2 and the outer member 9 is provided with two opposing radial pegs 10 arranged at right angles to the pegs 4 and slidably engaging corresponding apertures in the intermediate member 3. The outer member 9 is rotatingly supported by a bearing 11 with rollers 12 within a casing 13. This casing 13 is displaceable in a plane perpendicular to the axis of the rotor shaft 1 to vary the eccentricity $e$ of the outer member 9 relative to said axis. Means to effect such displacement are shown in Figs. 3 and 4. According to Fig. 3 the casing 13 is supported by two radially extending pegs 17 which rest slidably in supports 18 for displacements in the direction of arrows 19. Such displacement may be initiated by any conventional means not shown in this figure. According to Fig. 4 the said eccentric displacement of the casing 13 is effected by the bell crank 15 attached with one arm to the casing 13 and oscillatingly mounted in its support 16.

It will be well understood that the outer member 9 guided by the bearing 11, 12 and the intermediate member 3 while rotating with the inner member 2 and the rotor shaft 1 will perform a radial reversing motion relative to the axis of the rotor shaft 1, the magnitude of this radial motion being equal to said eccentricity $e$ which may be varied as described above by adjusting the position of the casing 13 and thereby of the outer member 9 relative to the axis of the rotor shaft.

The said radial reversing motion of the outer member 9 or of the intermediate member 3 is utilized to effect the said cyclic oscillation of each rotor blade about its longitudinal axis. To this effect the outer ends of the forked levers 5 described are connected by an articulated coupling 14 to the intermediate member 3 or to an integral part thereof such as the support or arm 3a. The reversing radial movement imparted to the outer end of the lever 5 in the direction of the longitudinal blade axis $y$—$y$ (Fig. 2) will effect the desired cyclic oscillation of the rotor blade about said longitudinal axis. The magnitude of this angular movement will be in direction relation to the said eccentricity $e$.

A slightly modified embodiment of my invention is illustrated in Figs. 5 and 6. This embodiment differs from that shown in Figs. 1 and 2 only therein that the free ends of the forked levers 5 do not cooperate with the intermediate members 3 but with the outer member 9. As shown this member 9 is provided with radially extending supports or arms 9a which contain an articulated bearing 14 for the free ends of the forked lever 5.

While specific embodiments of my invention have been shown and described in detail to illustrate the application of the principles of my invention, it will be well understood that the same may be otherwise embodied without departing from such principles.

What I claim as my invention is:

1. A cyclic pitch control mechanism for aircraft having a rotor shaft, a rotor hub keyed thereupon, and rotor blades mounted in said hub for oscillation about their longitudinal axes, said control mechanism comprising three gimbal members concurrently rotating with said shaft, namely an inner driving member attached to said shaft, an outer ringlike control member surrounding said inner driving member, and an intermediate ringlike coupling member between said inner member and said outer member, said intermediate and said outer member mounted for eccentric displacement relative to each other and to the rotor shaft, a bearing rotatingly supporting said outer member and mounted for eccentric displacement relative to the rotor shaft, means to effect said displacement of said bearing, said intermediate member and said outer member while rotating with the rotor shaft executing a cyclic radial reversing motion relative to the rotor shaft during each revolution, and means transmitting said radial reversing motion to the rotor blades and converting such motion into a cyclically alternating angular motion of said rotor blades to change their pitch.

2. A cyclic pitch control mechanism for aircraft having a rotor shaft, a rotor hub keyed thereupon, and rotor blades mounted in said hub for oscillation about their longitudinal axes, said control mechanism comprising three gimbal members concurrently rotating with said shaft, namely an inner driving member attached to said shaft, an outer ringlike control member surrounding said inner driving member, and an intermediate ringlike coupling member between said inner member and said outer member, said intermediate and said outer member mounted for eccentric displacement relative to each other and to the rotor shaft, a bearing rotatingly supporting said outer member and mounted for eccentric displacement relative to the rotor shaft, means to effect said displacement of said bearing, said intermediate member and said outer member while rotating with the rotor shaft executing a cyclic radial reversing motion relative to the rotor shaft during each revolution, supports integral with the intermediate member and a connecting member between each support and each rotor blade, each said connecting member with one end articulately jointed to said support and with its other end linked to a rotor blade to convert the reversing radial motion of said intermediate member into an alternating angular motion of said rotor blade.

3. A cyclic pitch control mechanism for aircraft having a rotor shaft, a rotor hub keyed thereupon, and rotor blades mounted in said hub for oscillation about their longitudinal axes, said control mechanism comprising three gimbal members concurrently rotating with said shaft, namely an inner driving member attached to said shaft, an outer ringlike control member surrounding said inner driving member, and an intermediate ringlike coupling member between said inner member and said outer member, said intermediate and said outed member mounted for eccentric displacement relative to each other and to the rotor shaft, a bearing rotatingly supporting said outer member and mounted for eccentric displacement relative to the rotor shaft, means to effect said displacement of said bearing, said intermediate member and said outer member while rotating with the rotor shaft executing a cyclic radial reversing motion relative to the rotor shaft during each revolution, supports integral with the outer member and a connecting member between each support and each rotor blade, each said connecting member with one end articulately jointed to said support with its other end linked to the rotor blade to convert the reversing radial motion of said outer member into an alternating angular motion of said rotor blade.

4. A cyclic pitch control mechanism for aircraft having a rotor shaft, a rotor hub keyed thereupon, and rotor blades mounted in said hub for oscillation about their longitudinal axes, said control mechanism comprising three gimbal members concurrently rotating with said shaft, namely an inner driving member attached to said shaft, an outer ringlike control member surrounding said inner driving member, and an intermediate ringlike coupling member between said inner member and said outer member, said intermediate and said outer member mounted for eccentric displacement relative to each other and to the rotor shaft, a bearing rotatingly supporting said outer member and mounted for eccentric displacement relative to the rotor shaft, means to effect said displacement of said bearing, said intermediate member and said outer member while rotating with the rotor shaft executing a cyclic radial reversing motion relative to the rotor shaft during each revolution, a forked single-arm lever for each rotor blade, a pivot obliquely attached to each blade, each pivot mounted in the forked end of its respective lever, and the shank end of each lever articulately mounted in one of the radially reversing members.

JAROSLAV ŠLECHTA.

REFERENCES CITED

The following references are of record in the file of this patent:

UNITED STATES PATENTS

| Number | Name | Date |
| --- | --- | --- |
| 1,370,587 | Jackson | Mar. 8, 1921 |
| 1,449,129 | Pescara | Mar. 20, 1923 |
| 1,885,640 | Strandgren | Nov. 1, 1932 |